Patented May 15, 1923.

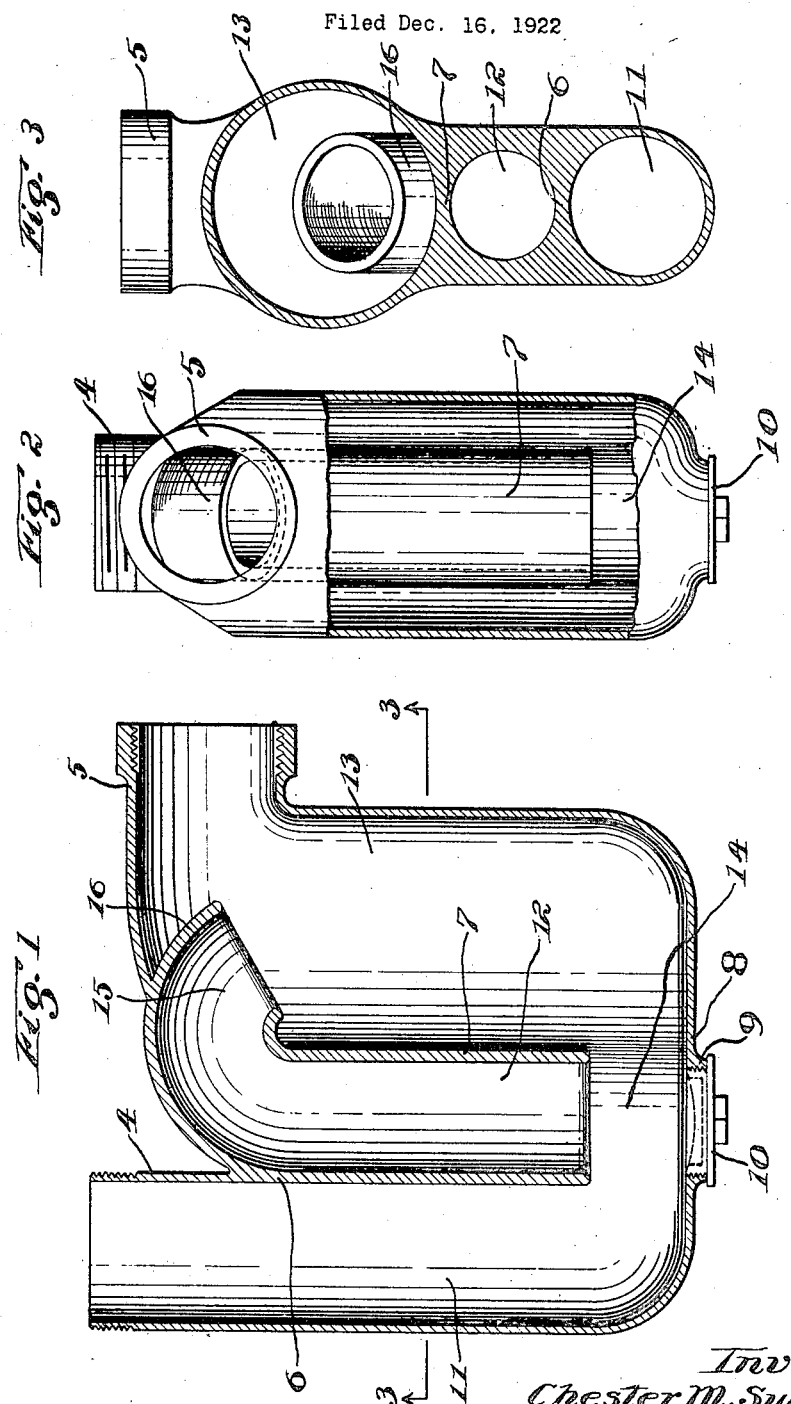

1,455,279

UNITED STATES PATENT OFFICE.

CHESTER M. SYLVESTER, OF MIDDLEBORO, MASSACHUSETTS.

TRAP FOR DRAINS AND THE LIKE.

Application filed December 16, 1922. Serial No. 607,312.

*To all whom it may concern:*

Be it known that I, CHESTER M. SYLVESTER, a citizen of the United States of America, and resident of Middleboro, in the county of Plymouth and State of Massachusetts, have invented new and useful Improvements in Traps for Drains and the like, of which the following is a specification.

This invention relates to traps for drains and the like and in particular to that type of trap in which the vent is incorporated within the trap itself. One object of the invention is to provide a trap of the type described which will offer such resistance to the syphoning effect of a mass of water rushing by the outlet thereof that sufficient water will be retained therein to serve as a seal. Another object is to prevent the accumulation of filth, grease, etc., in the outlet chamber and in the vent. Other objects will be apparent from the detailed description of the invention.

Exhaustive tests of known traps of this type have demonstrated that either through faulty construction or design they cannot stand up under very heavy syphonic action such as induced by a vertical drop of forty feet of a large head of water released by a quick opening valve. As a result of such tests and other experiments the herein described trap has been developed which can meet the conditions above described and which has other advantages which will be later apparent.

I have discovered that the capacities of the outlet inlet and vent chambers of the trap must have critical values and that for effective resistance to syphonic action the capacity of the outlet chamber must be greater than the capacity of either of the other two chambers and further that it should be greater than the combined capacities of both. Furthermore the direction of flow imparted by the vent chamber to the liquid diverted therethrough is highly important in preventing the trap from being emptied by the syphonic action and in keeping the trap free of accumulations of grease, lint and filth.

For the purpose of illustrating the invention one concrete embodiment thereof is shown in the accompanying drawing in which:

Fig. 1 is a vertical longitudinal sectional view through a trap embodying the features of the invention;

Fig. 2 is a right end elevational view of the trap shown in Fig. 1 with part of the casing broken away; and Fig. 3 is a horizontal sectional view on the line 3—3 of Fig. 1.

The embodiment of the invention shown for the purpose of illustration comprises a hollow metal casing preferably in the form of a casting having an exteriorly threaded inlet extension 4 by which the trap is connected to the fixture to be served thereby and an interiorly threaded discharge extension 5 for connection to the waste pipe. The interior of the casing is divided into chambers by partitions 6 and 7 which may take the form of integral webs, these webs terminating in spaced relation to the substantially horizontal bottom 8 of the casing which has an opening 9 in which a cleanout plug 10 has threaded connection. The integral webs 6 and 7 divide the hollow casing into a plurality of chambers, viz, an inlet chamber 11, a vent chamber 12, and an outlet chamber 13. As indicated in Fig. 3 the outlet casing 13 is larger than either of the other casings, and in fact has a greater capacity than both the other chambers combined for a purpose which will be later set forth.

The inlet chamber 11, the vent chamber 12, and the outlet chamber 13 are directly connected by a passageway 14 in the base of the trap, so that when the trap is flushed by liquid entering through the inlet 4, the natural course is directly from the inlet chamber 11 through the connecting passage 14 up into the vent chamber 12 and the outlet chamber 13 and thence from both through the discharge connection 5. While the direct path for the liquid would appear to be from inlet chamber 11 through passageway 14 and out through chamber 13, the mass of liquid forming the water seal of the trap is largely in chamber 13 by reason of its greater size and this mass serves initially as a buffer for the inrush of water through the inlet chamber 11 deflecting a part of it up into the vent chamber 12 whereupon the water continues to pass off through both the vent chamber and the outlet chamber until air is drawn into the vent chamber to break the syphonic action as is hereinafter described.

The vent chamber 12, as clearly indicated in Fig. 1, is interposed between inlet chamber 11 and outlet chamber 13, and issues from the connecting passageway 14 at substantially a right angle thereto, extending upwardly in parallelism with the adjacent chambers and, by the provision of a curved mouth 15 formed by an arched circular extension 16 thereof, enters the upper end of the outlet chamber 13 whereby it is adapted to discharge any fluid passing therethrough in a generally downward direction across the discharge opening in extension 5 and downwardly into the outlet chamber 13 adjacent the outer wall thereof in a manner to produce a circulation of fluid within the outlet chamber.

As previously indicated the normal path of liquid through the trap when the fixture to which the trap is connected is flushed, is through the inlet chamber 11, passageway 14, up through vent chamber 12 and outlet chamber 13, and out through the discharge opening. When the inflow of water ceases and the water in the inlet has fallen to the level of the bottom of the web 6 air escapes from the inlet chamber through the vent chamber to the outlet and the syphonic action is arrested. Under normal conditions it is apparent that there will always be, by reason of the great capacity of outlet chamber 13, sufficient liquid retained within the trap to form an effective water seal.

The action of the trap under heavy syphonic action caused by a large head of water projected past the discharge opening 5 from considerable height is as follows.

The liquid retained in the trap and forming the seal would be drawn upwardly in both the vent chamber 12 and the outlet chamber 13 by the suction produced until the water in the inlet chamber 11 is lowered sufficiently to expose the lower end of web 6. Air will then be drawn from the inlet chamber 11 through the vent chamber 12 into the outlet chamber and the waste pipe, thus frustrating the tendency to siphon off the water seal. With the air will go a certain percentage of water in the form of a spray which has a cleansing effect and which after it is drawn through the vent chamber 12 and the curved extension 16 thereof is deflected downwardly into the outlet chamber 13 and caused to impinge upon the upwardly drawn water in the outlet chamber 13, thus tending to force back this water at the same moment that the syphonic action is broken, so that a considerable body of water due to the large capacity of the outlet chamber 13 is retained within the casing to effectively maintain the water seal of the trap. The extension 16 of the vent chamber 12 by reason of the directional impulse imparted to the liquid passing therethrough in a generally outward and downward direction into the outlet chamber produces a local disturbance in the outlet chamber in the nature of a circulation of the liquid therewithin, thus mitigating to a great extent, if not entirely preventing, the accumulation of grease, lint and filth upon the walls of the outlet chamber. As clearly shown in Fig. 1 the extension 16 does not project far enough into the top of the outlet chamber 13 to impede in any substantial manner the free flow of liquid through the outlet chamber and out of the discharge connection 5 in the normal operation of the trap, but its extent and curvature is such as to cause the fluid drawn therethrough to obstruct the movement of liquid from the outlet chamber to the discharge opening when the trap is under heavy syphonic action. When the syphonic action is broken as described the liquid still remaining in chamber 13 drops back by gravity into the trap, the impingement of the air and spray from the vent chamber 12 assisting the force of gravity to retain sufficient water in the trap for an effective seal.

Extensive experimentation has shown that effective resistance to powerful syphonic action in a trap of the character described can be secured only when the discharge chambers are arranged and disposed substantially in the manner herein described and further that the relative sizes of the different chambers must be critically related to each other. One size of the trap shown which has withstood the most rigid tests as regards maintenance of a water seal under powerful syphonic action and freedom from accumulations of grease and filth therein, which tend to clog traps of this character, has its chambers circular in cross-section and of substantially the following dimensions: the diameter of the inlet chamber is 1¼ inches, of the vent chamber 1¼ inches, and of the outlet chamber 2½ inches. The heights of the various chambers being substantially the same, the relative proportions of the capacities of various chambers as well as of their cross-sectional areas to one another are substantially as folows: inlet to outlet chamber 1 to 3; vent chamber to outlet chamber 1 to 4; and combined capacities or cross-sectional areas of inlet and vent chamber to outlet chamber 3 to 5. The height of the passageway 14 from the bottom of the casing to the lower end of webs 6 and 7 is substantially one inch and the diameters of the inlet and discharge openings are preferably about 1½ inches. The cross-sectional form of the chambers need not be accurately circular although preferably so but may be oval or any other desired shape provided no sharp corners or irregular surfaces occur to interfere with the free flow of the liquid. In making traps of larger or smaller size in conformity with the service required of them, the dimensions should be substantially proportional to those given above.

I claim:

1. A trap comprising a casing having inlet, vent and outlet chambers in juxtaposition, said chambers communicating together at the base of the trap and the vent and outlet chambers having discharge openings at the same height, the capacity of the outlet chamber being greater than the combined capacities of the inlet and vent chambers whereby sufficient water is retained in the outlet chamber when the trap is subjected to heavy syphonic action to provide a seal for the trap.

2. A trap comprising a hollow casing having vertical partitions terminating in spaced relation to the base thereof forming substantially coextensive inlet, vent, and outlet chambers interconnected below, said vent chamber being arranged to empty into said outlet chamber adjacent the top thereof to produce circulation of the liquid within said outlet chamber to prevent the collection of filth on the sides of said outlet chamber.

3. A trap comprising a hollow casting having vertically disposed partitions terminating in spaced relation to the base thereof and forming inlet, vent and outlet chambers all interconnected at the bottom, said vent chamber depending to the liquid seal level of the trap and communicating with said outlet chamber adjacent the top of the latter by a curved downturned mouth for directing fluid conducted therethrough downwardly into the outlet chamber to hold back sufficient water in the outlet chamber to seal the trap when syphonic action is broken.

4. A trap having an inlet chamber, an outlet chamber, and a vent chamber interposed between said inlet and outlet chambers, said vent chamber extending toward the bottom of the trap but being spaced therefrom to provide a passage interconnecting all said chambers at the bottom, said outlet chamber having a discharge opening adjacent the top thereof, and said vent chamber being arranged to discharge fluid past said discharge opening into said outlet chamber adjacent one side thereof to produce circulation of liquid in said outlet chamber and to retain sufficient liquid to seal the trap when syphonic action is broken through said vent chamber.

5. A trap having an inlet chamber, an outlet chamber, and a vent chamber interposed between said inlet and outlet chambers, a passage interconnecting all said chambers at the bottom, said outlet chamber having a discharge opening adjacent the top thereof, and said vent chamber having a curved downturned tubular portion forming a mouth terminating in the upper portion of said outlet chamber in position to discharge fluid past said discharge opening and downwardly into the outlet chamber adjacent the outer wall thereof to produce circulation in said outlet chamber and to retain sufficient water to seal the trap when syphonic action is broken through said vent chamber.

6. A trap having spaced inlet and outlet chambers connected by a passage across the base of said trap, and a vent chamber interposed between the inlet and outlet chambers connecting with said passage at the bottom and arranged to discharge downwardly into said outlet passage at the top thereof to produce circulation in said outlet chamber.

7. A trap having spaced inlet and outlet chambers connected by a passage across the base of said trap, and a vent chamber interposed between the inlet and outlet chambers connecting with said passage at the bottom and arranged to discharge downwardly into said outlet passage at the top thereof, the cross-sectional areas of said outlet chamber being greater than the combined cross-sectional areas of said inlet and vent chambers.

8. A trap comprising a casing having an inlet chamber and an outlet chamber in spaced relation, a passageway directly connecting said chambers, a vent chamber interposed between said first-named chambers and issuing from said passageway at substantially a right angle thereto, said vent chamber being laterally enclosed throughout its length and terminating in a portion arranged to discharge downwardly into said outlet chamber adjacent the top thereof.

9. A trap comprising a casing having a substantially flat basal portion and having inlet and outlet apertures at the upper part thereof, said casing being centrally divided by a pipe like member spaced from the bottom and providing an inlet chamber communicating with the inlet aperture and a larger outlet chamber communicating with the outlet aperture, said pipe having a reversely bent portion substantially on line with the outlet aperture providing a mouth directing the discharge from the pipe toward the outlet chamber.

Signed by me at Middleboro, Massachusetts, this twelfth day of December, 1922.

CHESTER M. SYLVESTER.